3,060,193
METHOD OF PRODUCING AROMATIC
SULPHONES
Cornelis Johannes Schoot, Klaas Hinderikus Klaassens, and Johannes Jacobus Ponjee, Eindhoven, Netherlands, assignors to North American Philips Company, Inc., New York, N.Y., a corporation of Delaware
No Drawing. Filed July 30, 1958, Ser. No. 751,883
Claims priority, application Netherlands Aug. 13, 1957
8 Claims. (Cl. 260—332.3)

This invention relates to a method of producing aromatic sulphones which is characterized in that an aromatic compound RH, wherein R is a benzene, naphthene or thiophen nucleus carrying at least one hydrocarbon radical or at least one ether or thio-ether group, or a non-substituted thiophen nucleus, is reacted with an aromatic sulphohalide $R'.SO_2.X$, wherein $R'$ is a benzene or naphthalene nucleus which may carry at least one halogen atom, at least one hydrocarbon radical or at least one ether or thio-ether group and X is a halogen atom, the compound RH and the sulphohalide, however, containing no free hydroxyl-, sulphydryl- or amino-groups, in the presence of a metal salt of ortho-, meta- or pyrophosphoric acid or a mixture of these acids, with the exception of the salts of the alkali metals and alkaline-earth metals, so that sulphones according to the general formula $R.SO_2.R'$ are produced.

In this method, substitution takes place in the nucleus of the aromatic compound RH, so that sulphones are produced the sulphur atom of which is directly bound to both aromatic nuclei R and R'.

This is illustrated by the following equation, which represents the reaction when silver metaphosphate is used as a condensation agent:

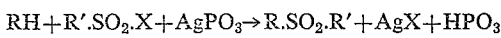

$$RH + R'.SO_2.X + AgPO_3 \rightarrow R.SO_2.R' + AgX + HPO_3$$

Suitable aromatic compounds are compounds according to the formula RH, wherein R is a benzene, naphthene or thiophen nucleus carrying at least one hydrocarbon radical which may be an alkyl-, aralkyl- or aryl-group, for example, a methyl, benzyl, or phenyl group. Satisfactory results are achieved particularly with the derivatives of benzene. It has been found that suitable substituents are alkyl-groups having each from 1 to 18 carbon atoms, for example a hexyl-, octyl- or decyl-group, more particularly the groups having each from 1 to 5 carbon atoms, for example an ethyl, propyl, isopropyl, butyl or tertiary butyl group and preferably a methyl group. Further suitable compounds are benzene, naphthalene, and thiophen derivatives having at least one, more particularly 1 to 3 and preferably one ether or thio-ether group as substituents in the nucleus, which group or groups may be either an alkoxy-, aralkoxy- or aryloxy-group or the corresponding thioether group. Particularly good results are achieved by using a benzene derivative the nucleus of which contains an alkoxy group having from 1 to 5 carbon atoms, for example an ethoxy-, propoxy- or buthoxy-group and preferably a methoxy group. A particularly suitable compound is monomethoxybenzene.

Furthermore the method in accordance with the invention is of particular importance for the production of sulphones of compounds according to the formula RH, where R represents a thiophen nucleus which may be substituted, the nucleus and the substituents containing no free hydroxyl, sulphydryl or amino groups. Suitable constituents in the thiophen nucleus are alkyl groups, particularly groups having each from 1 to 18 carbon atoms, for example, a hexyl, octyl or decyl group and preferably groups having each from 1 to 5 carbon atoms, for example an acyl, propyl, isopropyl, butyl or tertiary butyl group and especially a methyl group and also aliphatic ether or thio-ether groups, more particularly groups having each from 1 to 5 carbon atoms and preferably groups having one carbon atom each. Thiocoumarone also is suitable.

A well-known method of producing aromatic or mixed aliphatic-aromatic sulphones is the method according to Friedel-Crafts, in which an aromatic or aliphatic carbonic acid halide is reacted in the presence of a condensation agent, for example aluminum chloride. However, this method is not very suitable for the production of ketones of compounds which contain an aliphatic or cyclic ether or thioether group. Under the action of the condensation agent splitting off the ether or thioether bonds will generally take place as a secondary reaction. In the method in accordance with the invention this disadvantage does not occur; ether and thioether bonds are substantially not attacked.

Suitable aromatic sulpho-halides are the sulpho-halides of benzene and naphthalene and also those derivatives of these aromatic hydrocarbons which carry at their nuclei at least one halogen atom, for example at least one bromine and iodine atom and particularly a chlorine atom. Further suitable aromatic sulpho-halides are the sulpho-halides of benzene and naphthalene in which the nucleus carries at least one of the hydrocarbon radicals, ether or thioether groups described with respect to the aromatic compound RH.

It has furthermore been found that particularly good results are achieved by the use of benzene sulpho-halides, particularly those having a substituent in the para position.

In arriving at the methods in accordance with the invention it has also been found that particularly good results are attained by the use of the sulphochlorides. This applies particularly to 4-methyl-, 4-methoxy- and 4-chlorobenzene sulphochloride.

Suitable condensation agents are ortho-, meta- or pyrophosphoric acid salts of the metals of the B sub-groups (odd series) of the periods IV, V and VI and of the groups VIII of the periodic table of the elements and the manganese salts, and particularly the salts of the group comprising the metals silver, zinc, cadmium, copper, mercury, tin and lead. The reaction proceeds smoothly and completely by using salts of the metals silver, zinc and cadmium and particularly silver salts.

The experiments which have led to the method in accordance with the invention have shown that the use of metal salts of ortho- and metaphosphoric acid are slightly to be preferred, since by their use higher yields are obtained than by the use of the metal salts of pyrophosphoric acid.

Furthermore both the acid and the neutral salts of ortho- and pyrophosphoric acid can be used. The neutral salts are preferred since they can be used in lesser weight than the acid salts.

Use may also be made of mixtures of the phosphoric acid salts.

The experiments which have led to the method in accordance with the invention have shown that the addition of the metal salt and/or sulfohalide at the reaction temperature slightly increases the yield of sulphone.

It has also been found that the reaction of the metal salt and the halide is exothermic. Therefore, in order to prevent excessive heat production within a short period of time, it may be desirable for the metal salt and/or the halide to be added to the reaction mixture either little by little or continuously and slowly. This applies particularly if large amounts are used and as the addition is effected at an elevated temperature.

Generally, the reaction of the metal salt and the sulphohalide proceeds rapidly and quantitatively under the reaction conditions. Hence it is not necessary or desirable for an excess of one of these reactants to be employed. Therefore preferably use is made of equivalent amounts of the metal salt and the sulphohalide concerned.

The reaction must be carried out under substantially anhydrous conditions. This implies that the reactants must be entirely or substantially anhydrous so that, when metal salts containing water of crystallization are used, the water of crystallization must be previously removed therefrom entirely or substantially entirely. This can be effected by heating, preferably under reduced pressure. Since the crystallized silver salts or ortho-, meta- and pyrophosphoric acid contain no water of crystallization, these salts are to be preferred for this reason also.

It was also surprising to find that for the reaction to proceed smoothly and completely the reaction mixture must contain a trace of water. This is proved, for example, by carrying out the reaction under completely dry conditions and then adding a trace of water. Thus, if use is made of, for example, the yellow-coloured silver orthophosphate and a sulphochloride, it is observed that the yellow colour persists under completely dry conditions and only after the addition of the water is replaced by the substantially white colour of the silver chloride then produced.

Alternatively, the reaction can be performed in the presence of a diluent which is a solvent for the aromatic compound RH. As inert diluents use can be made of aliphatic hydrocarbons such as benzene, aromatic compounds, such as chlorobenzene and nitrobenzene, aliphatic ethers, for example, dibutyl ether, and aliphatic esters, such as butyl acetate. It has also been found that the use of a nitroalkane as a diluent increases the yield. Thus, nitromethane and nitropropane are very suitable diluents.

As a diluent use may also be made of an excess of the aromatic compound RH. The amount used of the aromatic compound RH has no or substantially no influence on the purity of the sulphone produced, for it has been found that irrespective of the proportions of the amounts used of the aromatic compound RH and of the sulphohalide, only monosulphones are always formed substantially. No or substantially no disulphones are produced. This applies also if a small relative amount of the aromatic compound is used.

The reaction is preferably carried out at an elevated temperature of between 80° C. and 180° C. and preferably between 100° C. and 150° C.

The sulphones produced by the method according to the invention can be used for a variety of purposes. Certain of these sulphones may, for example, be used as starting materials for syntheses, as solvents or diluents, as softeners, in dielectrics and insulating material, as tanning materials, as antibiotics, as basic materials for the production of dyestuffs as bactericides and as therapeutic agents.

The invention will be illustrated by the following examples:

EXAMPLE I

*Production of 4.4'-Dimethoxydiphenylsulphone*

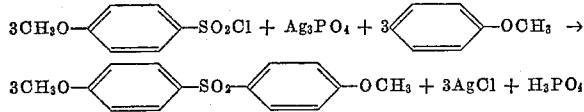

In a flask of 100 cc. capacity, which was provided with a reflux cooler and a tube of calcium chloride, a suspension of 14 g. (0.033 mole) of silver orthophosphate in a mixture of 20.6 g. (0.1 mole) of 4-methoxybenzenesulphochloride and 20 g. (0.185 mole) of methoxybenzene to which 2 drops of water were added, was heated under reflux to boiling temperature on an oil bath for 3 hours. After cooling of the reaction mixture, the liquid was decanted from the separated silver chloride, this chloride being extracted with benzene several times. The decanted liquid and the extract were mixed, the benzene being distilled off subsequently. After the addition of an aqueous solution of 8 g. of sodium hydroxide the distillation residue was subjected to a distillation with the aid of steam. The excess methoxybenzene distilled over and any residual 4-methoxybenzenesulphochloride was converted into the sodium salt of 4-methoxybenzene sulphonic acid. After cooling, the distillation residue was filtered, the 4,4'-demethoxydiphenylsulphone being retained on the filter. Yield of crude product: 22 g., that is 79% calculated with respect to 4-methoxybenzenesulphochloride.

After crystallisation from ethanol the melting point was 126° C. The melting point of a mixture with pure 4,4'-dimethoxy-diphenylsulphone was 126° C. also.

EXAMPLE II

*Production of 4-Methoxydiphenylsulphone*

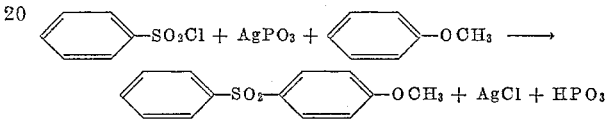

In a flask of 100 cc. content, which was equiped with a reflux cooler provided with a tube of calcium chloride, a suspension of 18.7 g. (0.1 mole) of silver metaphosphate in a mixture of 17.7 g. (0.1 mole) of benzenesulphochloride and 20 g. (0.185 mole) of methoxy benzene, to which a few drops of water were added, was boiled under reflux for 3 hours. After cooling the reaction mixture, the silver chloride which separated out was filtered off and subsequently extracted with benzene several times. The filtrate and the benzenic extract were collected, the benzene being distilled off subsequently. The distillation residue was distilled with the use of steam after a solution of 8 g. of sodium hydroxide in water had been added. The methoxy benzene distilled over, any residual benzene sulphochloride being converted into the sodium salt of benzene sulphonic acid. After cooling the residue was filtered, 18 g. of 4-methoxydiphenylsulphone being retained on the filter; yield 72.5%. After crystallization from ethanol the melting point was 90° C.

EXAMPLE III

*4-Methyldiphenylsulphone*

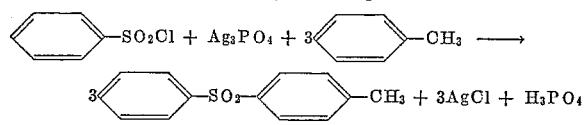

In a manner which was completely similar to that described in Example I, from benzenesulphochloride and toluene 4-methyl-diphenylsulphone was produced in a yield of 60%. After crystallization from ethanol the melting point of this product was: 124° C.

EXAMPLE IV

*4,4'-Dimethoxydiphenylsulphone*

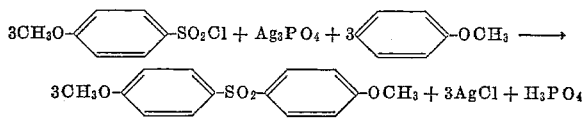

In a flask of 200 cc. content, which was equipped with a reflux cooler provided with a tube of calcium chloride, a suspension of 14 g. (0.033 mole) of silverorthophosphate in a solution of 20.6 g. (0.1 mole) of 4-methoxybenzene-sulphochloride and 10.8 g. (0.1 mole) of methoxybenzene in 40 g. of nitromethane was heated to boiling temperature for three hours. After completion of the reaction the reaction mixture was cooled. The separated silver chloride was filtered off and extracted with benzene. The filtrate and the benzenic extract were mixed, the benzene being distilled off subsequently. A solution of 8 g. of sodium hydroxide in water was added to the distillation residue, the assembly being distilled with the aid of steam. The excess methoxybenzene and the nitromethane used as a solvent distilled over, while the residual 4-methoxybenzene sulphochloride was converted into the sodium salt of 4-methoxy benzene sulphonic acid. After distillation the residue was cooled and filtered. 20.0 g. of crude 4,4'-dimethoxy-diphenylsulphone were retained on the filter; yield 72%. After crystallization from ethanol the melting point was 126° C. The mixed melting point was also 126° C.

EXAMPLE V

*4-Methoxyphenyl-Thienylsulphone*

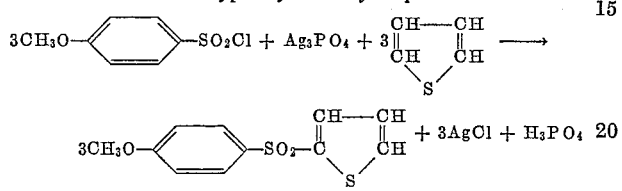

In a flask of 100 cc. content, which was equipped with a reflux cooler provided with a tube of calcium chloride, a suspension of 14 g. (0.033 mole) or silverorthophosphate and a solution of 20.7 g. (0.1 mole) of 4-methoxybenzenesulphochloride and 8.4 g. (0.1 mole) of thiophen in 30 g. of nitromethane were boiled under reflux on an oil bath for three hours. Subsequently the reaction mixture was cooled and the separated silver chloride was filtered off. The silver chloride was extracted with hot benzene several times. The filtrate and the benzenic extracts were mixed and subjected to a distillation with the aid of steam. Benzene, nitromethane and a small amount of unconverted thiophen distilled over. The distillation residue was filtered after cooling down. 20 g. of crude 4-methoxyphenyl-thienylsulphone were retained on the filter; yield 80%. After crystallization from ethanol the melting point was 106° C.

EXAMPLE VI

*4-Chloro-4'-Methoxydiphenylsulphone*

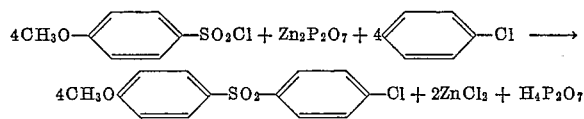

A mixture of 15.2 g. (0.05 mole) of anhydrous zinc-pyrophosphate, 20.6 g. (0.1 mol) 4-methoxybenzenesulphochloride and 50 cc. of chlorobenzene were heated to boiling temperature in a flask of 100 cc. capacity which was equipped with a reflux cooler provided with a tube of calcium chloride, under reflux on an oil bath for 2.5 hours. After cooling, the separated zinc chloride was removed from the mixture by filtering. The chloride was extracted with hot chlorobenzene. The filtrate and the extract were mixed together and the mixture subjected to a distillation with the aid of steam after a solution of 8 g. of sodium hydroxide in water had been added. The chlorobenzene distilled over, any residual 4-methoxybenzene sulphochloride being converted into the sodium salt of 4-methoxysulphonic acid. On completion of the distillation the residue was cooled and filtered. On the filter 12.0 g. of crude 4-chloro-4'-methoxydiphenylsulphone were retained; yield 42.5%. After crystallization from ethanol the melting point was 89° C.

EXAMPLE VII

*4-Chloro-4'-Methoxy-Diphenylsulphone*

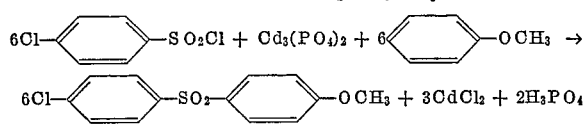

A mixture of 8.8 g. (0.0167 mole) of anhydrous cadmium orthophosphate, 20.3 g. (0.1 mole) of 4-chloro benzene sulphochloride and 21.6 g. (0.2 mole) of methoxy benzene were heated in a flask of 100 cc. capacity which was equipped with a reflux cooler provided with a tube of calcium chloride, to boiling temperature on an oil bath for 3 hours. After cooling the separated cadmium chloride was removed from the reaction mixture by filtering. The chloride was extracted with hot benzene. The filtrate and the extract were mixed together and the mixture subjected to distillation with the aid of steam after a solution of 8 g. of sodium hydroxyde in water had been added. The excess methoxy benzene distilled over, any residual 4-methoxybenzene sulphochloride being converted into the sodium salt of 4-methoxy benzene sulphonic acid. On completion of the distillation, the residue was cooled and filtered. On the filter 18.1 g. of crude 4-chloro-4'-methoxydiphenylsulphone were retained; yield 64%. After crystallization from ethanol the melting point was 89° C.

EXAMPLE VIII

*2,4,5,4'-Tetrachlorodiphenylsulphone*

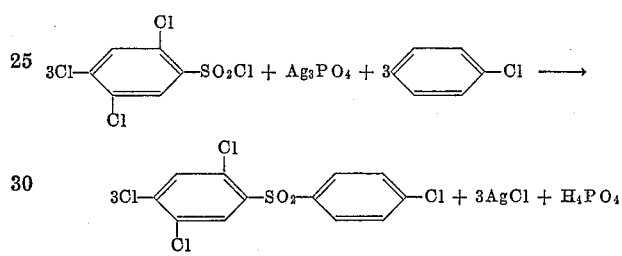

A mixture of 28 g. (0.2 mole) of 2,4,5-trichlorobenzoyl-chloride, 14 g. (0.033 mole) of silverorthophosphate and 50 ccs. of chlorobenzene were boiled under reflux for 5 hours. The yellow colour of the silver phosphate was replaced comparatively slowly by the white colour of the silver chloride. On completion of the reaction the silver chloride was filtered off and washed with chlorobenzene. 30 ccs. of petroleum ether (boiling point range 40–60° C.) were added to the filtrate. On cooling, 3 g. of 2,4,5,4'-tetrachlorodiphenylsulphone crystallized out. Melting point: 138° C.

What is claimed is:

1. A process for producing aromatic sulfones of the formula:

$$(Y)_n—R—SO_2—R'—(V)_m$$

wherein R is an aromatic nucleus selected from the group consisting of naphthalene, benzene and thiophene, Y is a substituent selected from the group consisting of unsubstituted alkyl of 1–18 carbons, phenyl, benzyl, alkoxy of 1–5 carbons, thioalkoxy of 1–5 carbons and halogens, R' is an aromatic nucleus selected from the group consisting of benzene and napthalene, V is a substituent selected from the group consisting of unsubstituted alkyl of 1–18 carbons, phenyl, benzyl, alkoxy of 1–5 carbons, thioalkoxy of 1–5 carbons and halogens, $n$ is, in all cases other than where R is thiophene, an integer from 1 to 3 and when R is thiophene, $n$ is an integer of 0–3, $m$ is an integer of 1 to 3 comprising the steps, condensing a mixture of an aromatic compound of the formula $(Y)_n—R—H$ wherein R, Y and $n$ have their previously designated meanings and an aromatic sulfohalide of the formula $(V)_m—R'—SO_2X$ wherein V, R' and $m$ have their previously designated meanings and X is a halogen atom in the presence of at least one phosphoric acid metal salt in which the acid is selected from the group consisting of metaphosphoric acid, orthophosphoric acid and pyrophosphoric acid and mixtures thereof and the metal is selected from the group consisting of silver, zinc, cadmium, mercury, tin, lead, copper and manganese and recovering the resultant aromatic sulfone from the reaction mixture.

2. A process for producing aromatic sulfones of the formula:

$$(Y)_n-R-SO_2-R'-(V)_m$$

wherein R is an aromatic nucleus selected from the group consisting of napthalene, benzene and thiophene, Y is a substituent selected from the group consisting of unsubstituted alkyls of 1–18 carbons, phenyl, benzyl, alkoxy of 1–5 carbons, thioalkoxy of 1–5 carbons and halogens, R' is an aromatic nucleus selected from the group consisting of benzene and napthalene, V is a substituent selected from the group consisting of unsubstituted alkyl of 1–18 carbons, phenyl, benzyl, alkoxy of 1–5 carbons, thioalkoxy of 1–5 carbons and halogens, $n$ is in all cases, other then where R is thiophene, an integer of 1 to 3 and when R is thiophene $n$ is an integer of 0 to 3, $m$ is an integer of 1 to 5 comprising the steps condensing a mixture of an aromatic compound corresponding to the formula $(Y)_n-R-H$ wherein R, Y and $n$ have their previously designated meanings and an aromatic sulfohalide corresponding to the formula $(V)_m-R'-SO_2X$ wherein V, R' and $m$ have their previously designated meanings and X is a halogen atom in the presence of silver orthophosphate.

3. The process of claim 2 wherein the reaction is carried out in the presence of an excess amount of the aromatic compound.

4. The process of claim 2 wherein the reaction is carried out in the presence of a nitroalkane diluent selected from the group consisting of nitropropane and nitromethane.

5. The process of claim 2 wherein benzene sulfochloride is reacted with methoxybenzene.

6. The process of claim 2 wherein 2,4,5-trichlorobenzoyl chloride is reacted with chlorobenzene.

7. The process of claim 2 wherein thiophene is reacted with 4-methoxy-benzenesulfochloride.

8. The process of claim 2 wherein 4-methoxybenzenesulfochloride is reacted with methoxybenzene.

References Cited in the file of this patent

UNITED STATES PATENTS

| | | |
|---|---|---|
| 2,224,964 | Huismann | Dec. 17, 1940 |
| 2,314,379 | Zerweck et al. | Mar. 23, 1943 |
| 2,483,499 | Lieber et al. | Oct. 4, 1949 |
| 2,521,514 | Hartough | Sept. 5, 1950 |
| 2,768,211 | Towne et al. | Oct. 23, 1956 |

FOREIGN PATENTS

| | | |
|---|---|---|
| 168,164 | Australia | Nov. 16, 1956 |

OTHER REFERENCES

Meisel et al.: Journal of the American Chemical Society, vol. 72, page 1911 (1950).